(12) United States Patent
Sutton et al.

(10) Patent No.: US 7,054,838 B2
(45) Date of Patent: May 30, 2006

(54) METHOD AND SYSTEM FOR TRANSACTING AN ANONYMOUS PURCHASE OVER THE INTERNET

(75) Inventors: David B. Sutton, Monroe, MI (US); Douglas E. Blasiman, Bowling Green, OH (US)

(73) Assignee: PrivaCash, Inc., Toledo, OH (US)

( * ) Notice: Subject to any disclaimer, the term of this patent is extended or adjusted under 35 U.S.C. 154(b) by 243 days.

(21) Appl. No.: 10/060,044

(22) Filed: Jan. 28, 2002

(65) Prior Publication Data

US 2002/0120530 A1 Aug. 29, 2002

Related U.S. Application Data

(63) Continuation of application No. PCT/US00/20672, filed on Jul. 28, 2000, which is a continuation-in-part of application No. 09/363,499, filed on Jul. 29, 1999, now abandoned.

(51) Int. Cl.
*G06F 17/60* (2006.01)

(52) U.S. Cl. .............................. 705/35; 705/41; 705/74

(58) Field of Classification Search .................... 705/1, 705/35–42, 72–79, 14
See application file for complete search history.

(56) References Cited

U.S. PATENT DOCUMENTS

| | | | |
|---|---|---|---|
| 5,621,787 A * | 4/1997 | McKoy et al. ......... | 379/121.06 |
| 6,000,608 A | 12/1999 | Dorf | |
| 6,014,646 A | 1/2000 | Vallee et al. | |
| 6,185,545 B1 | 2/2001 | Resnick et al. | |
| 6,188,994 B1 * | 2/2001 | Egendorf ..................... | 705/40 |
| 6,189,787 B1 | 2/2001 | Dorf | |
| 6,405,182 B1 | 6/2002 | Cuervo | |
| 6,467,684 B1 | 10/2002 | Fite et al. | |
| 6,473,500 B1 * | 10/2002 | Risafi et al. ........... | 379/144.01 |
| 6,502,745 B1 * | 1/2003 | Stimson et al. ............. | 235/375 |
| 2001/0001321 A1 | 5/2001 | Resnick et al. | |
| 2001/0042784 A1 | 11/2001 | Fite et al. | |
| 2002/0026418 A1 | 2/2002 | Koppel et al. | |
| 2002/0174016 A1 | 11/2002 | Cuervo | |

OTHER PUBLICATIONS

Bennion, "The Debit Card's Expanding Frontiers", Credit Card Management, p. 61-62, May 1998, Dialog File 268, Accession No. 00335930.*

"Visa, MasterCard Square off for Debit Fight", American Banker, p. 3, vol. 153, No. 247, Dec. 20, 1988, Dialog File 625, Accession No. 0094030.*

* cited by examiner

*Primary Examiner*—Frantzy Poinvil
(74) *Attorney, Agent, or Firm*—Harness, Dickey & Pierce, P.L.C.

(57) ABSTRACT

A method is provided for transacting an anonymous purchase over the Internet. The method comprises the steps of: (a) acquiring intermediary credit account information (22) from a purchasing intermediary (35, 112); (b) providing transactional purchase information (24), including the intermediary credit account information, to a retailer (16, 128), where the transactional purchase information is provided by the purchaser (134) using a first computing device of a computer-implemented purchasing system (12); and (c) transacting a purchase (26) between the purchaser and the retailer (16, 126) using the intermediary credit account information, thereby maintaining the anonymity of the purchaser (134). A method is also provided for the inexpensive sale of cash cards (40) to a retail outlet (126) and for funding the cash cards (40) upon purchase by a consumer (134). The cash cards (40) are not funded until cash or credit through other credit cards is received from the consumer (134). After the consumer (134) has purchased the cash card (40), the consumer (134) must activate the card, and the purchase intermediary (112) awards commissions.

16 Claims, 9 Drawing Sheets

METHOD AND SYSTEM FOR TRANSACTING AN ANONYMOUS PURCHASE OVER THE INTERNET

CROSS-REFERENCE TO RELATED APPLICATIONS

This application is a continuation of PCT International Application PCT/US00/20672, filed Jul. 28, 2000, which is a continuation-in-part of U.S. patent application Ser. No. 09/363,499, filed Jul. 29, 1999 now abandoned. The disclosures of the above applications are incorporated herein by reference.

BACKGROUND OF THE INVENTION

The present invention relates generally to a method for making a purchase over the Internet, and more particularly to a method of transacting an anonymous purchase through the use of intermediary credit account information. The present invention also relates to a method for transacting the purchase and use of a cash card and an associated credit account.

Currently, a consumer wishing to make a purchase over the Internet must utilize their personal credit card. Secured servers utilized by online vendors accept credit cards and provide protection, via various encryption processes, for the interception of credit card information by third party "hackers". However, even if no "hacking" takes place, the vendor ultimately has the consumer's credit card number. Having the credit card number provides a trail back to the consumer's social security number and other private and personal information which the consumer would not normally circulate.

Possession of the credit card number, in effect, gives the vendor the opportunity to circulate information regarding the consumer, including the consumer's history of purchases which may be utilized for mass targeted mailings as well as any other marketing objectives. In addition, by using ones credit card, those purchases made over the Internet that a consumer may otherwise wish to keep confidential appear on the consumer's monthly credit card statement, and thus are available to others having access to the statement. In other words, circulating information relating to the consumer's purchase could prove to be damaging to the consumer. The current mechanism for transacting purchases over the Internet could lead to irreparable harm and embarrassment to one's credit standing as well as one's personal and professional business life. Accordingly, there is a significant need for a means by which a consumer may confidentially make a purchase over the Internet.

Therefore, it is desirable to provide a method of transacting an anonymous purchase through the use of intermediary credit account information. The purchase should be "untraceable" simulating a "cash" transaction which typically occurs in a typical "bricks and mortar" retail setting. This need will continue to grow exponentially as commercial transactions over the Internet continue to grow. Moreover, there is a rapidly growing need for those consumers who do not have access to a credit card to be able to conduct commercial transactions over the Internet. For instance, due to their credit history or age, there are numerous consumers who do not qualify for a credit card account. These types of consumers are fundamentally prohibited from participating in any Internet commerce transaction.

Providing a method of transacting an anonymous purchase through the use of intermediate account information creates many logistical hurdles. Distributing credit accounts and associated cash cards proves to be fairly complicated. In particular, the distribution of a pre-loaded, but yet unauthorized cash card proves to be less than attractive to the average retailer. Retailers desire to have maximum markup on each product sold. Selling $25, $50, $75 and $100 cash cards and associated credit accounts for $32, $57, $82 and $107, respectively, yield a minimal commission and minimal markup to retailers who typically desire a much better markup on inventory.

In order to realize wide spread distribution of cash cards and associated credit accounts, the inventory costs to retailers must be minimized. By way of comparison, prepaid phone cards are often sold at various retail outlets, including drug stores, party stores, department stores, discount clubs, and the like. Pre-paid phone cards, however, simply enable an exchange of currency for phone minutes. Thus, telecommunications companies which distribute pre-paid phone cards can supply them to retailers at a cost much less than a consumer may pay for an equal amount of minutes. That is, a phone card offering 30 minutes having a billable value of $9.00 could be offered to retail outlets by telecommunication companies for $2.00. The retail outlets may sell the phone card for $4.00. This provides a 100% markup on the cost of inventory to the retailer. Any type of analogous transaction for a pre-paid cash card and associated credit account, one the other hand, at best allows an exchange of currency for a cash card and credit account of approximately equal value. Accordingly, no such markup is presently available to retail outlets, thereby making a pre-paid cash card unattractive to the retail outlets. That is, a retail outlet has little incentive to pay $50 to receive $52 for a pre-paid cash card.

Accordingly, it is desirable to provide a method and system of activating a cash card and associated account while minimizing the cost to retail outlets, thereby making the purchase and sale of pre-paid cash cards much more attractive to the retailers.

SUMMARY OF THE INVENTION

In accordance with the present invention, a method is provided for transacting an anonymous purchase over the Internet. The method comprises the steps of: (a) acquiring intermediary credit account information from a purchasing intermediary; (b) providing transactional purchase information, including the intermediary credit account information, to a retailer, where the transactional purchase information is provided by the purchaser using a first computing device of a computer-implemented purchasing system; and (c) transacting a purchase between the purchaser and the retailer using the intermediary credit account information, thereby maintaining the anonymity of the purchaser.

This invention is also directed to a method of distributing an electronic cash card including the steps of providing an unfunded cash card to a retail outlet from a purchase intermediary and associating the cash card with data in a data file, wherein the data file indicates that the card has not been funded. The cash card is funded at the retail outlet upon purchase of the cash card for a predetermined value by a purchaser. A data file is updated upon funding of the cash card at the retail outlet. A fee is then remitted to the retail outlet after the cash card has been funded.

For a more complete understanding of the invention, its objects and advantages, refer to the following specification and to the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
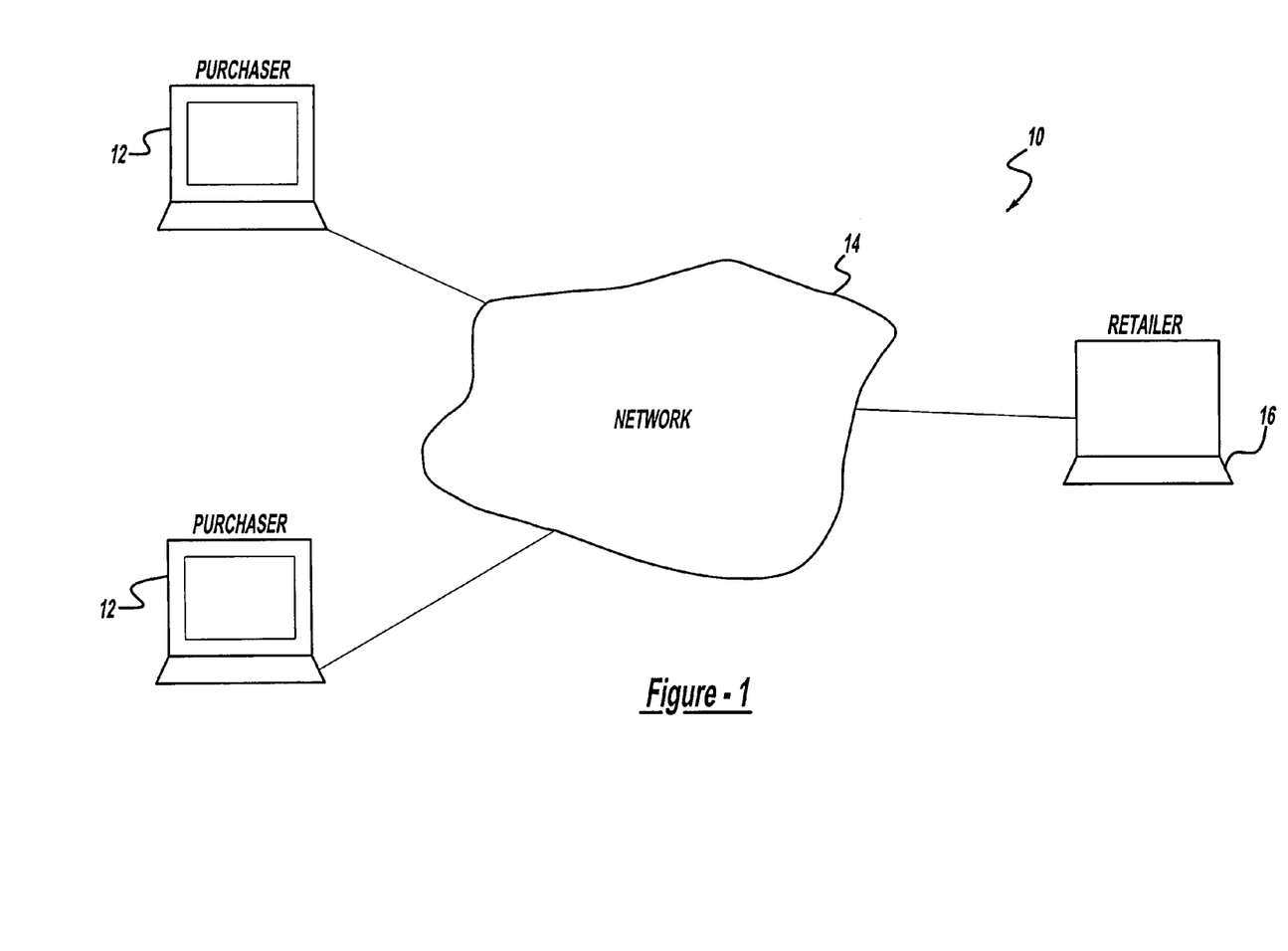
FIG. 1 is a diagram illustrating the basic components of a conventional computer-implemented purchasing system.

FIG. 1 illustrates the basic components of a conventional computer-implemented purchasing system 10. The purchasing system 10 is comprised of a plurality of purchasing computing devices 12 interconnected via a network 14 (e.g., the Internet) to at least one retail computing device 16. As will be apparent to one skilled in the art, the computing devices are able to communicate using common communication protocols (e.g., TCP/IP) over different types of network channels. For illustration purposes, a preferred embodiment of the computing device is a personal computer (PC). Of course, it will be appreciated that the principles of the invention can be employed in a wide variety of computing devices, including but not limited to a telephone, a television or a personal digital assistant (PDA).

Figure 2:
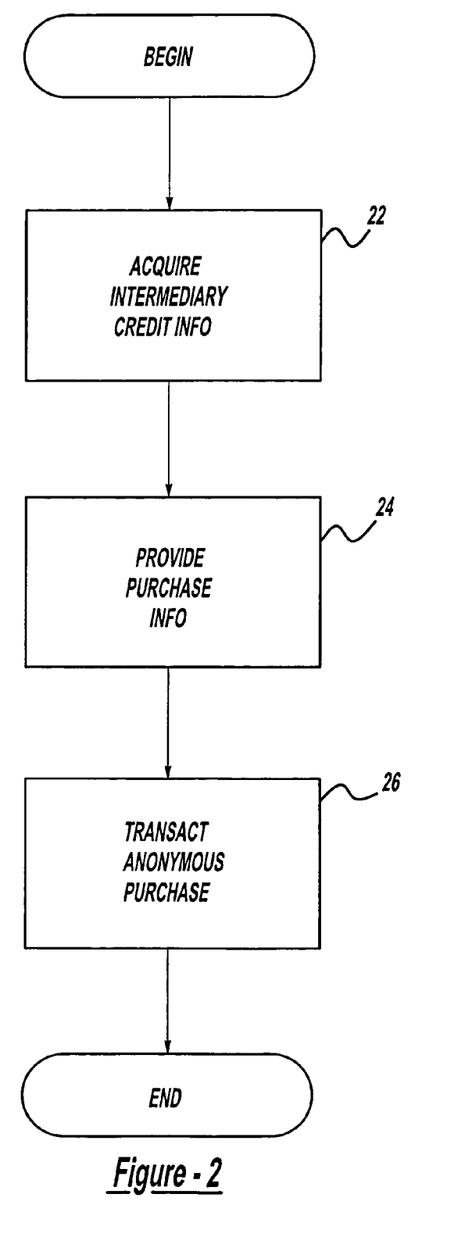
FIG. 2 is a flowchart showing a method for transacting an anonymous purchase in accordance with the present invention.

In accordance with the present invention, an overview of a method for transacting an anonymous purchase using the computer-implemented purchasing system 10 is shown in FIG. 2. First, a purchaser must acquire intermediary credit account information 22 from a purchasing intermediary. Next, the purchaser provides transactional purchase information 24, including the intermediary credit account information, to a retailer, using a purchasing computing device connected to the network 14. Lastly, a purchase is transacted 26 between the purchaser and the retailer through the use of the intermediary credit account information, thereby maintaining the anonymity of the purchaser. While the following description is provided with reference to an intermediary credit account, it is readily understood that an intermediary debit account is within the scope of the present invention.

Figure 3:
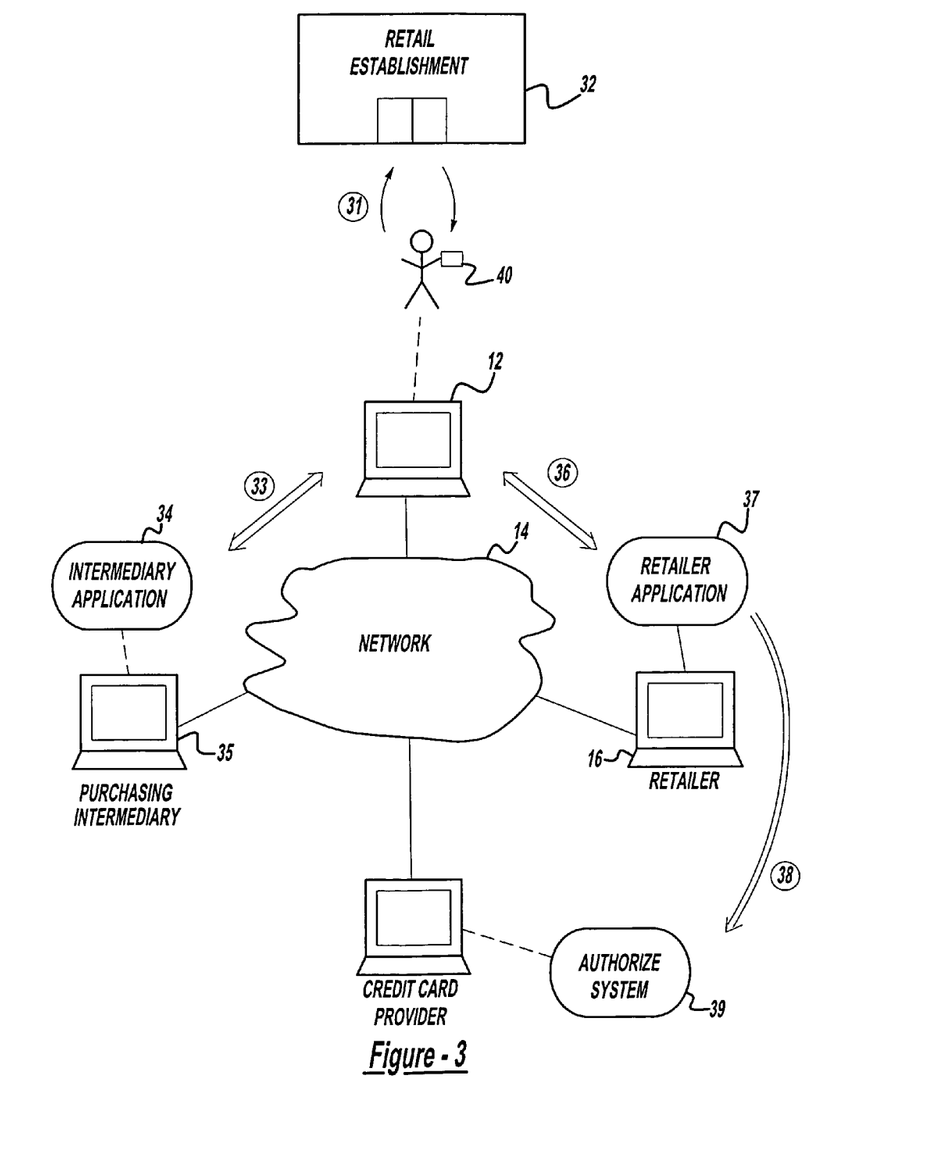
FIG. 3 is a detailed flow diagram of the method for transacting an anonymous purchase in accordance with the present invention.

A more detailed description of the method of the present invention is provided in conjunction with FIG. 3. The method of the present invention operates in a similar fashion to that of a pre-paid phone card. The primary objective of the method is to create a non-traceable means to transact a purchase over the Internet. In order to accomplish this task, there must exist a procedure for converting "real currency" to "Internet currency". In the context of this discussion, "real currency" refers to credit on a credit card or actual currency issued by a national treasury of any country. Therefore, a currency conversion must take place via an intermediary web site over the Internet or in a "bricks and mortar" retailer.

Figure 4A:
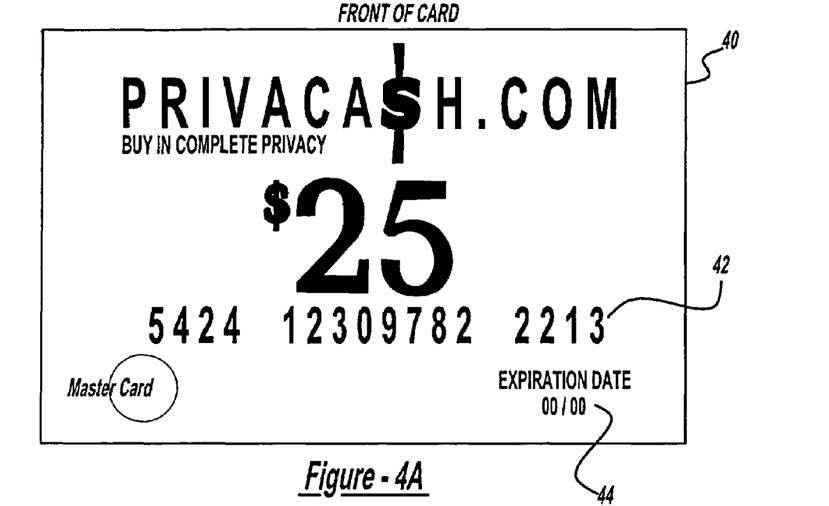
FIGS. 4A and 4B are a front and back view, respectively, of an exemplary pre-paid purchasing card in accordance with the present invention.
Figure 4B:
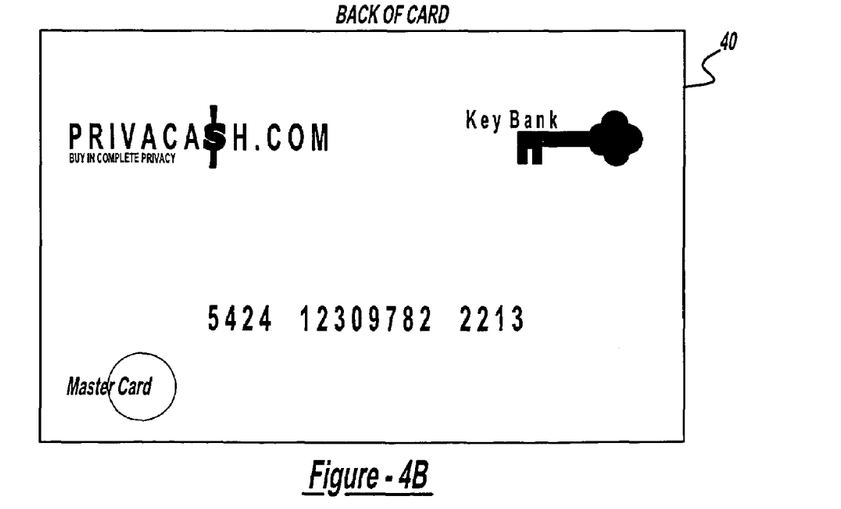

In the case of the "bricks and mortar" retailer, a pre-paid purchasing card is to be offered by the retailer in various predetermined denominations (e.g., $25, $50, or $100). The consumer would visit the retail establishment 32, such as a 7-11 store, a Wal-Mart store, or a Rite-Aid store, to buy 31 one or more purchasing cards. An exemplary purchasing card 40 is shown in FIGS. 4A and 4B. The purchasing card 40 includes a unique and non-traceable Master Card or Visa credit account number 42 and an expiration date 44 which allows the consumer the ability to make a purchase(s) over the Internet or in other "bricks and mortar" retail establishments. It is envisioned that the card will have a predetermined expiration (e.g., six month) from the date the consumer activates the card. As will be more fully explained below, there is also a credit limit associated with each purchasing card.

Each purchasing card 40 is a non-recourse or bearer credit card issued by a credit card provider (e.g., Citibank, BancOne, etc.). The credit card provider sells blocks of purchasing or cash cards to a purchasing intermediary 35. Each purchasing card is sold for a predetermined denomination (e.g., $23, $47 or $97) which corresponds to a credit limit that is associated with the purchasing card 40. The purchasing intermediary 35 in turn sells each purchasing or cash card 40 at a slightly higher cost to a consumer. For instance, a consumer would pay $25 for a purchasing card 40 which has an available credit limit of $22. The $3 difference in cost is a service fee captured by the purchasing intermediary 35. It should also be noted that as additional inducement for providing the actual physical purchasing cards, the credit card provider may receive a fee from the purchasing intermediary for each card which is activated and/or used by a consumer.

The purchasing cards are provided on a consignment basis by the purchasing intermediary 35 to participating retail establishments 32. Amongst other incentives, the retailer may also receive a fee from the purchasing intermediary for each purchasing card which was purchased at their retail establishment.

The consumer then buys the purchasing card 40 at the retailer establishment 32 either by charging the purchase on the consumer's credit card or through an exchange of actual cash currency. If the consumer elects to buy the purchasing card 40 with a credit card, then consumer's monthly billing statement from the credit card provider simply shows the name of the retailer and the aggregate amount of the purchase. On the other hand, if the consumer elects to buy a purchasing card 40 with cash currency there is no post purchase confirmation process.

In either case, the credit account number on the purchasing card 40 is not part of the transaction, and thus is not linked to the consumer. In other words, each purchasing card 40 is a bearer card which means it is as good as cash. Should the consumer lose or misplace the purchasing card 40, it may be used up to the limit available on the card by anyone in possession of the card. In this way, the purchasing card provides a means for preserving the anonymity of the purchaser in future purchases made over the Internet.

Once the consumer buys the purchasing card 40, they then need to activate 33 their purchasing card 40 by contacting the purchasing intermediary 35. It is envisioned that an intermediary software-implemented application 34 resides on a computing device which is operated by the purchasing intermediary 35. Thus, the intermediary application 34 may be accessed by the consumer via the network 14 using a purchasing computing device 12. More specifically, the intermediary application 34 may be associated with a web site on the Internet, where an address for the web site is provided on the purchasing card 40. The intermediary application 34 is receptive of the credit account number as entered by the consumer and operative to activate the card.

In order to activate their card, the consumer enters the credit account number shown on the purchasing card into the intermediary application 34. No further information is requested of the consumer. One skilled in the art will readily recognize that to activate the purchasing card 40, the intermediary application 34 may interface with an additional authorization system as provided by the credit card provider. Upon activation, the consumer has a set time from the activation date to exhaust the available funds of their purchasing card 40. While the above description discusses contacting the purchasing intermediary via the network, it is readily understood that other means are available for contacting the purchasing intermediary (e.g., via the telephone), thereby activating the purchasing card 40.

Figure 5:
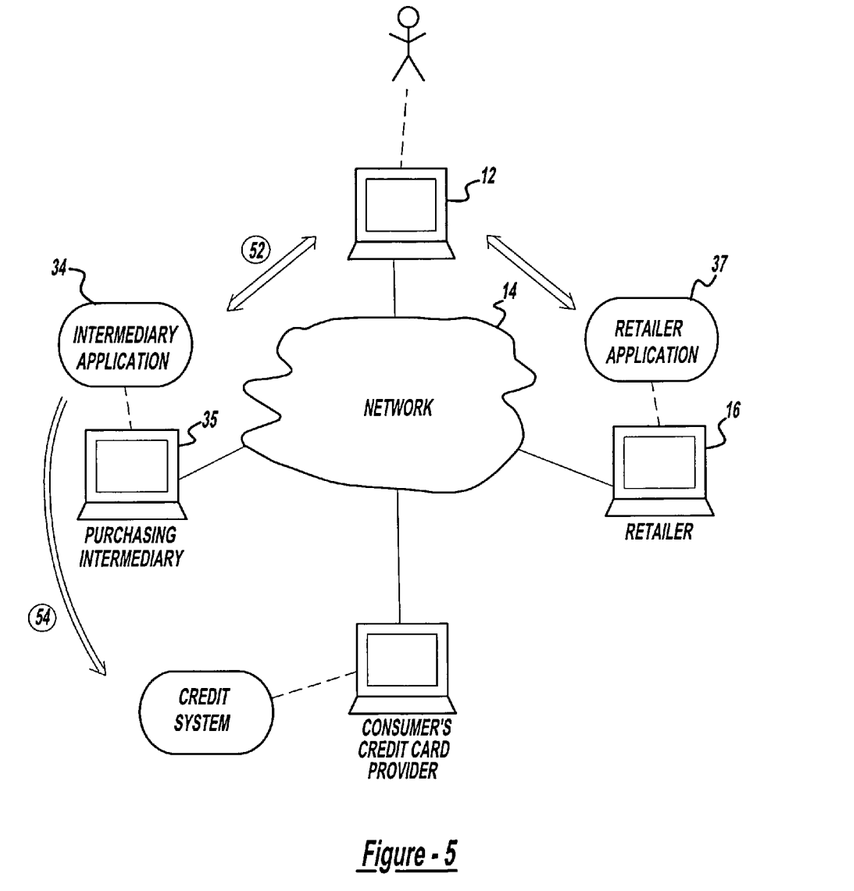
FIG. 5 is a detailed flow diagram of an alternative method for transacting an anonymous purchase in accordance with the present invention.

An alternative means for acquiring intermediary credit account information is described in relation to FIG. 5. Rather than visiting a retail establishment 32, the consumer may directly access 52 the intermediary application 34 in order to obtain intermediary credit account information. Instead of receiving a purchasing card, the consumer merely acquires the intermediary credit account information over the network 14. In this case, the intermediary application 34 is receptive of credit card information from the consumer and operative to provide intermediary credit account information to the consumer.

As part of this process, the consumer's credit card is debited 54 for the cost (e.g., $25, $50 or $100) associated with acquiring the intermediary credit account information. As previously explained, the intermediary credit account information includes a credit account number, an expiration date, and a credit limit (e.g., $23, $47 or $97) which is slightly less than the cost associated with the service. The consumer's monthly billing statement from the credit card provider will simply show the name of the purchasing intermediary and the aggregate amount of the purchase. Again, the intermediary credit account information is not linked to the consumer, thereby maintaining the anonymity of the purchaser in future Internet transactions.

Once the consumer acquires intermediary credit account information, they are free to use it to make an online purchase over the Internet as shown in either FIG. 3 or FIG. 5. The consumer must first accesses a retailer's software-implemented application 37 in order to transact a purchase 36. It is envisioned that the retailer's application 37 resides on the retailer's computing device 16 which is accessed via the network 14 using a purchasing computing device 12. In particular, the retailer's application 37 may be associated with a web site on the Internet. Furthermore, the retailer's application 37 is receptive of purchase transactional information from the consumer and operative to transact a purchase with the consumer over the network 14.

When the consumer is ready to make a purchase, they are prompted through a series of payment and shipping questions to provide purchase transactional information. As will be apparent to one skilled in the art, the purchase transactional information describes the purchased goods or services as well as provides payment information from the consumer, including the credit account number associated with the intermediary credit account information. The intermediary credit account information further provides at least some pseudo purchase transactional information to the consumer. For instance, each purchasing card may have the same or a different name listed on the card. When the consumer is prompted by the retailer's application 37 to provide a name, they simply insert the name, for example the name of the purchasing intermediary or "John Smith" as provided on the card. The consumer will also be prompted to provide the credit account number and the expiration date associated with the purchasing card. One skilled in the art will readily recognize that as part of transacting the purchase, the retailer's application 37 may verify 38 that the purchase price does not exceed the credit limit associated with the purchasing card. To do so, the retailer's application 37 may interface with an additional authorization system 39 as provided by either the purchasing intermediary or the credit card provider.

Of course, the consumer is free to make other purchases up to the credit limit associated with their intermediary credit account. In the case the purchasing card, the card can be discarded once the funds on the purchasing card are exhausted. In addition, any residual funds remaining on the consumer's purchasing card may be drawn out (e.g., using any ATM facility or bank) prior to the expiration date by the consumer.

In the event that the purchase is for goods which need to be shipped to the consumer, the consumer will also need to provide shipping instructions. The consumer has two options: (1) provide a shipping address (i.e., home or business address) or (2) utilize a forwarding service provided by the purchasing intermediary. It is noteworthy that the consumer's address does not alone generally ensure access to a consumer's credit history and other confidential personal information. Thus, a consumer may opt to provide a shipping address and yet retain anonymity from the retailer.

In the later case, the goods will be shipped to the purchasing intermediary who will then ship the goods to the consumer. To do so, the intermediary credit account information provides an intermediary shipping address which the consumer can provide to the retailer. The consumer's shipping address may be captured by the purchasing intermediary when the consumer is activating their purchasing card, and then, upon receipt of the goods from the retailer, it is used to ship the goods to the consumer. An additional service fee covering at least up to the shipping costs may be charged by the purchasing intermediary to the consumer. It is envisioned that the service fee may be debited to the available funds remaining on the purchasing card.

It is widely known that large retailers spend considerable money to circulate discount coupons to consumers. The present invention offers an alternative distribution channel for these retailers. In particular, the intermediary application 34 may further be operative to provide discount coupons to the consumer. While the consumer is either activating their purchasing card or acquiring intermediary credit account information, the consumer may select from a menu of participating retailers. The consumer would then be directed to a web site or other type of software application where they could check to see if any discount coupons were being offered by the retailer. If so, they could simply print the coupon on a printer attached to their local computing device 12. The consumer may also be asked to answer a short series of non-personal questions in conjunction with obtaining the coupon. The questions are typically designed to determine relevant product user information. By enabling retailers the ability to offer their coupons in conjunction with this service, the purchasing intermediary is then able to charge a service fee to the retailer, thereby deriving another revenue stream.

While the system of FIGS. 1–5 describes broadly the concept of utilizing a purchase intermediary to provide a credit account, and possibly a cash card, to a purchaser, FIGS. 6–9 detail a system which makes distribution of cards to retailers a relatively low cost inventory item to the retailer and provides an incentive to the retailer for carrying cash cards for sale.

Figure 6:
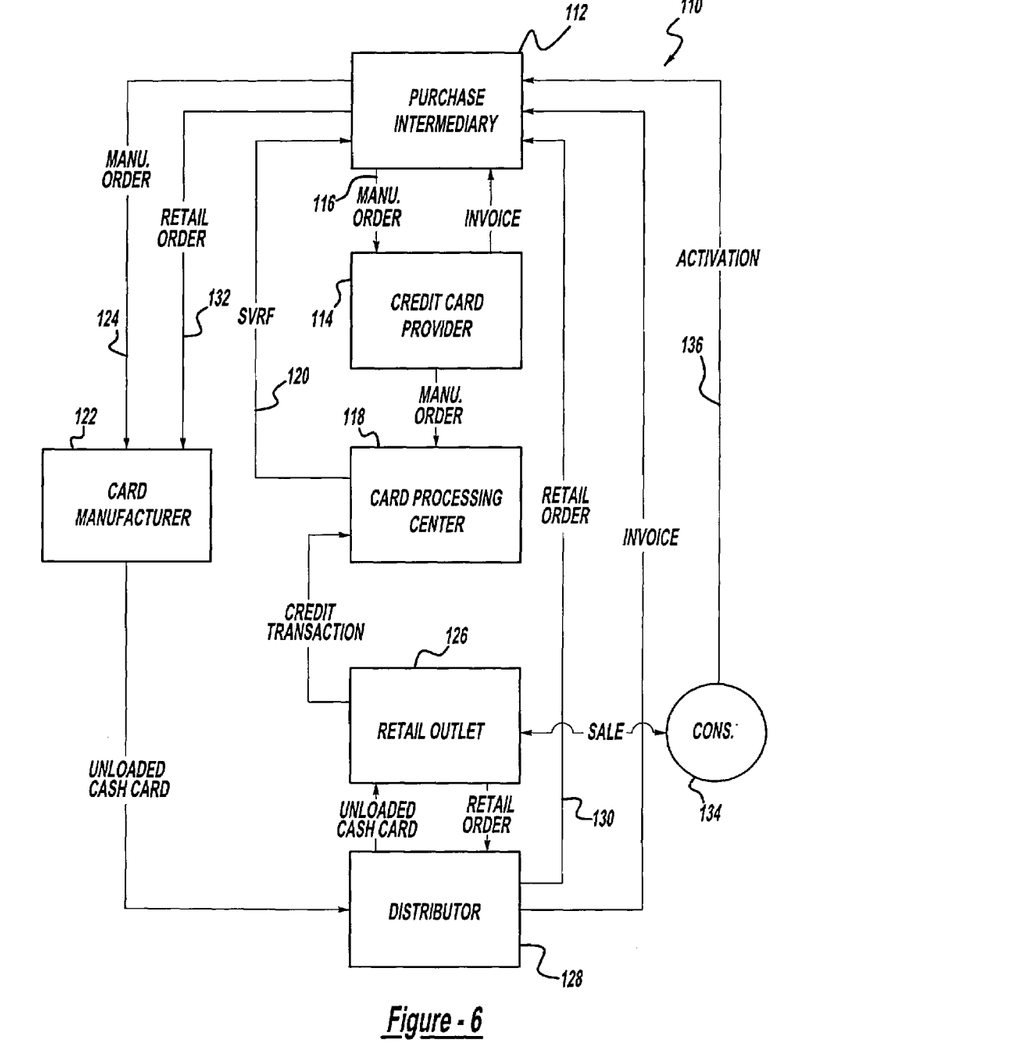
FIG. 6 depicts a block diagram of a system for funding cash cards in accordance with the principles of the present invention.

FIG. 6 depicts a block diagram of a system for distributing cash cards and an associated account. The cash card distribution system 110 of FIG. 6 will be described generally with respect to distributing cash or credit cards and associated accounts in predetermined denominations, such as $25, $50, $75, $100, and other predetermined denominations. Cash card distribution system 110 includes a purchase intermediary 112, which operates as described above with respect to FIGS. 1–5. In particular, purchase intermediary provides a credit account for use by a card purchaser. In practice a purchase intermediary operates as a merchant account for a predetermined credit card provider.

Purchase intermediary 112 sends out an order, referred to as a manufacturing order, to a credit card provider 114 for a predetermined number of cards in predetermined denominations. The manufacturing order that purchase intermediary 112 places with credit card provider 114 is typically relayed electronically through a communications link 116 by sending an order file to credit card provider 114. Credit card provider 114 is preferably embodied as a member financial institution of a credit card organization, such as MASTERCARD, VISA, and the like. The credit card provider may include a card processing center 118 which processes the order file and generates a single value return file (SVRF) back to purchase intermediary 112 on communications link 120.

Purchase intermediary 112 receives the SVRF from card processing center 118 and transmits an order for the physical cash cards to card manufacturer 122 on communications link 124. Card manufacturer 122 receives a SVRF file and typically can build and emboss up to 9,999 cash cards per SVRF file. Card manufacturer 122 produces the physical credit or cash card, including a magnetic strip, graphics, and messaging desired by purchase intermediary 112.

Card manufacturer 122 also manufactures the manufactured cash card to a card carrier which provides a convenient package when displaying the cash card for retail purchase at the retail outlet. The card carrier and cash card optionally include various information. For example, the cash card manufactured by card manufacturer 122 may be embodied as shown in FIGS. 4a, 4b. Further, the card may include a web site address of purchase intermediary 112. The carrier may include the same information and may also include coupons, advertising, and the like. Typically, the card carrier is bigger than the card and can handle more information, advertising, coupons, and the like. Once manufactured, card manufacturer 122 typically stores the manufactured, unloaded or unfunded cards in a secure facility for later distribution.

After the cash cards and carriers are manufactured and stored, they are held until an order is received from a retail outlet 126. Retail outlet 126 may be any of the brick and mortar facilities described above. For example, retail outlet 126 may be a department store, drug store, convenience store, party store, and the like. Many typical retail outlets, particularly those associated with retail outlet chains, often order and receive goods through a distributor 128. Accordingly, retail outlet 126 places an order for cash cards to be stocked and sold at retail outlet 126 through distributor 128. Distributor 128 places the retail order with purchase intermediary 112 via a communications link 130. Purchase intermediary 112 receives the retail order and in turn generates an order for the purchase intermediary cash card to card manufacturer 122 via communications link 132. The order sent by purchase intermediary 112 to card manufacturer 122 preferably includes a number identifying the particular retail outlet 126 and the distributor identification number. Note that communications links 130, 132 may be implemented using an electronic data interchange (EDI) system and format, as are well known in the art.

Once card manufacturer 122 receives the order, card manufacturer 122 ships the cash cards to distributor 128. More particularly, the cash cards are shipped to a distributor 128 distribution center. Distributor 128 then ships the cash cards from the distribution center to retail outlet 126. Upon receipt of the cash card shipment, distributor 128 generates an invoice to retail outlet 126. The invoice typically charges on a per card basis. Retail outlet 126 then checks the card and carrier package into inventory and places the inventory on display in a pre-selected area of retail outlet 126.

A particular feature of the present invention is that the cash card/carrier combination shipped from card manufacturer 122 to retail outlet 126 can be billed to retail outlet 126 at a value which is much less than the denomination of the cash card. For example, any $25, $50, $75, $100, or any other denominations, cash card can be sold to the retail outlet for $0.01, because the card shipped from card manufacturer 122 to retail outlet 126 has not yet been loaded. Thus, the card/carrier combination may be sold to retail outlet 126 for less than the cost of the manufacturing of the cash card and carrier.

A customer or consumer 134 purchases a cash card from retail outlet 126 by purchasing the cash card and attached carrier. Upon purchase, personnel at retail outlet 126 sell the card/carrier combination to customer 134. Typically, the sale is for the value of the card plus some premium. For example, cards valued at $25, $50, $75, $100 are typically sold for $32, $57, $82, $107, respectively. Alternatively, advertisements and coupons placed on the cash card and/or the carrier enable the retail outlet 126 to offer cash card for a value less than the indicated denomination. For example, such cash cards could be sold by the retail outlet for $23, $47, $72, $97, respectively. Such cash card accounts may be pre-funded by the participating coupon providers or advertisers. Upon purchase, personnel at retail outlet 126 swipe the magnetic strip of the cash card through a card reader, typically known as a ZON machine, smart card reader or other reading device, to credit the total value of the sale to the card. That is, the cash card account is credited with $32, $57, $82, $107 for the purchase of a cash card valued at $25, $50, $75, $100.

The credit is processed between retail outlet 126 and card processing center 118. Card processing center 118 sends the credit transaction information to purchase intermediary 112 over communications link 120. Purchase intermediary 112 maintains a database of the SVRF files for each card ordered from card manufacturer 122. Card manufacturer 122 returns a listing by cash card number of what retail outlet 126 has received particular cash. Purchase intermediary 122 checks the cash card number and the retail outlet where that cash card number was credited against the cash card number and the retail outlet where card manufacturer 122 shipped the cash card number. If the two do not match, purchase intermediary 112 will not activate the card.

The data sent from card processing center 118 to purchase intermediary 112 is stored and provides a listing of the cash cards purchased and the cash cards used. Consumer 134 cannot use the purchase card until the card has actually been activated through purchase intermediary 112. Accordingly, the cash card and carrier each preferably include a phone number and a web site managed by purchase intermediary 112 to enable activation of the cash card.

Consumer 134 contacts purchase intermediary 112 using communications link 136 which may be an internet connection or telephone connection in order to activate the purchase card. Activation of the purchase card occurs generally as described above with respect to FIGS. 1–5. In particular, the consumer provides to purchase intermediary 112 a name, shipping address, and email address, for a given credit card number. If the credit card number shows a credit as provided through card processing center 118 described above, activation is completed. If no credit transaction was received, the consumer 134 is requested to try again later. Note that failure to activate may be a detected attempt breach security or may simply indicate that purchase intermediary 112 database has not been updated for the card purchased by consumer 134. Repeated, failed attempts to activate cards will result in notification and termination of the registration process.

Upon activation, while at the web site of purchase intermediary 112, consumer 134 maybe be led through a menu of advertisers and sale web sites. In this manner, a consumer having a credited cash card can be led directly to web sites in order to utilize the card.

Upon completion of the registration process, the merchant account of purchase intermediary 112 is credited with the premium charge at retail outlet 126. The cost of the cash card to the consumer over and above the denomination of the cash card is considered the premium. In this particular embodiment, the premium is $7. Within a predetermined time period, purchase intermediary 112 remits to distributor 128 and retail outlet 126 the fee for sale of the cash card.

As described above, while at the web site of purchase intermediary 112, consumer 134 may take advantage of various discounts offers offered by the site, alternatively, consumer 134 may shop at traditional brick and mortar outlets.

As briefly described above, the cash cards issued in the process of FIGS. 6 typically include an expiration date. After the expiration date, consumer 134 may redeem the funds at any time within a twelve month period following the expiration date, subject to a predetermined monthly expired account fee. For consumers who provide an email address, during the registration process, purchase intermediary 112 may elect to notify consumers that the card will or already has expired.

Purchase intermediary 112 may elect to maintain a database of all transactions for a particular customer 134 so that upon future credit card purchases, purchase intermediary 112 may provide specific advertising information to consumer 134 to expedite and facilitate internet shopping or selection and printing of coupons specifically targeted to consumer 134. Alternatively, purchase intermediary 112, on its web site, may maintain a queue from which advertisers are sequentially and repeatedly selected and presented on the consumer 134 through the web site purchase intermediary 112.

Figure 7:
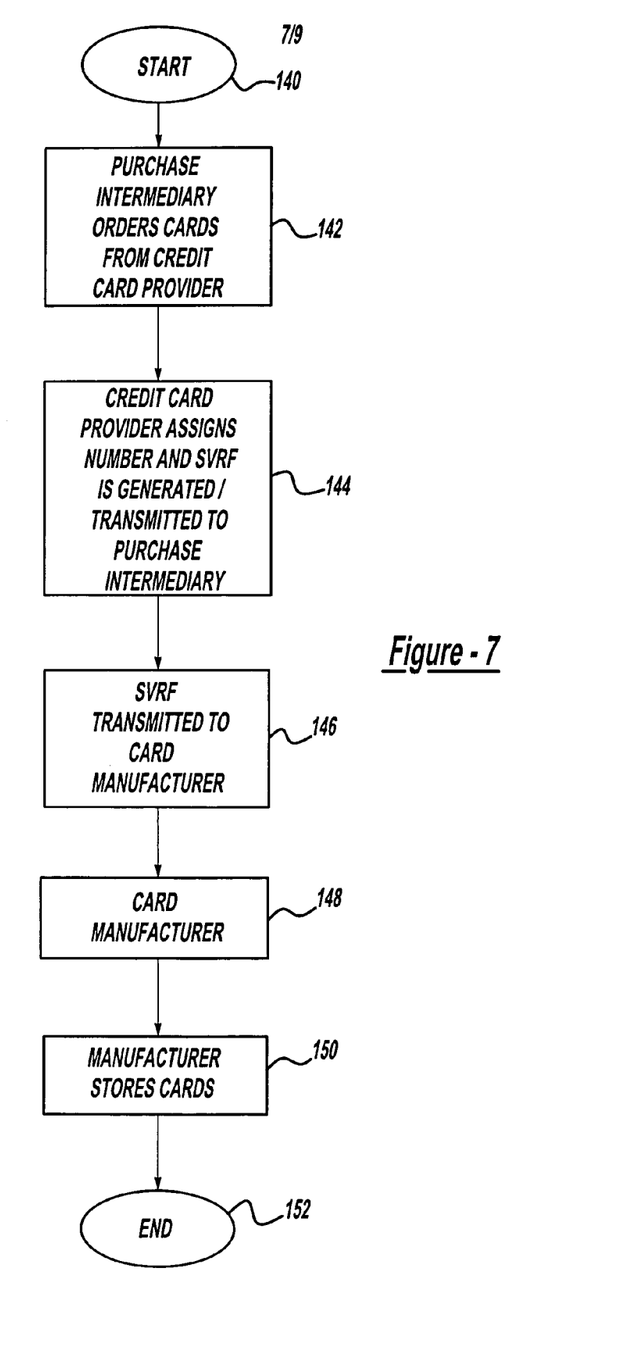
FIG. 7 is a flow chart of a method for ordering and manufacturing cards used in the system of FIG. 6.

FIG. 7 is a flow diagram of the process through which purchase intermediary orders cash cards from card manufacturer 122. In particular, control commences at start block 140 and proceeds to block 142 where the purchase intermediary orders cash cards from the credit card provider. Control then proceeds to block 144 where the credit card provider assigns a number and a SVRF file is generated and transmitted to the purchase intermediary. Control then proceeds to block 146 where the SVRF is transmitted to the card manufacturer in order to provide the number of cash cards and an identification number for each cash card manufactured by the card manufacturer. Control then proceeds to block 148 where the cash cards and carrier are manufactured and to block 150 where the cash cards are stored in a facility by the card manufacturer. Control then proceeds to block 152 the purchase intermediary ordering the cash cards.

Figure 8:
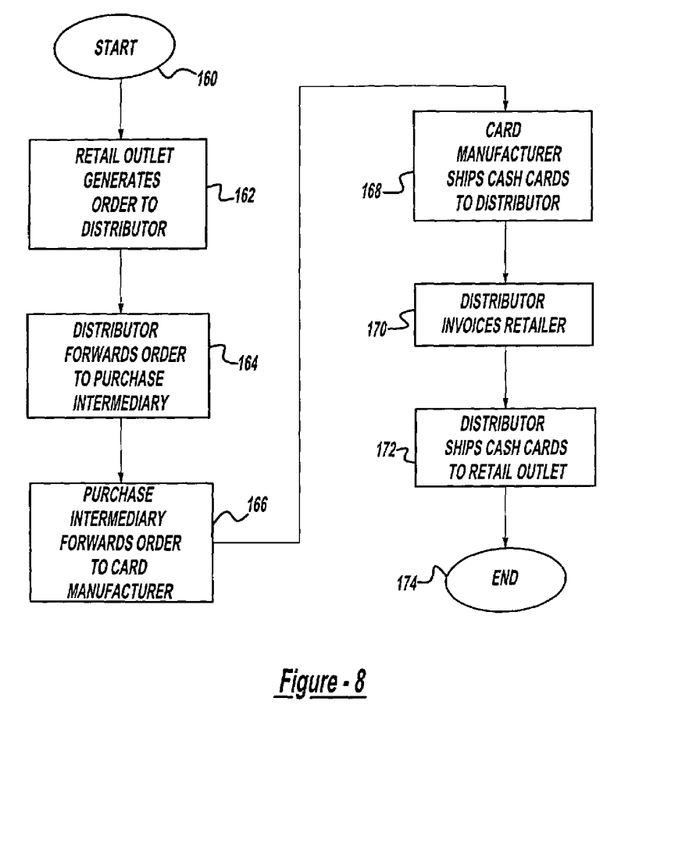
FIG. 8 is a flow chart of the method for distributing cards to retail outlets.

FIG. 8 depicts a block diagram for the order process by the retail outlet as described above. Control commences at start block 160 and proceeds to block 162 where the retail outlet generates an order to distributor. Control then proceeds to block 164 where the distributor forwards the order to the purchase intermediary and then to block 166 where the purchase intermediary forwards the order to the card manufacturer. At block 168, the card manufacturer ships the cards to the distributor, or, more particularly, to a distributor warehouse. Control then proceeds to block 170 where the distributor invoices the retailer. At block 172, the distributor ships the cash cards and attached carrier to the retail outlet. The process ends at block 174.

Figure 9:
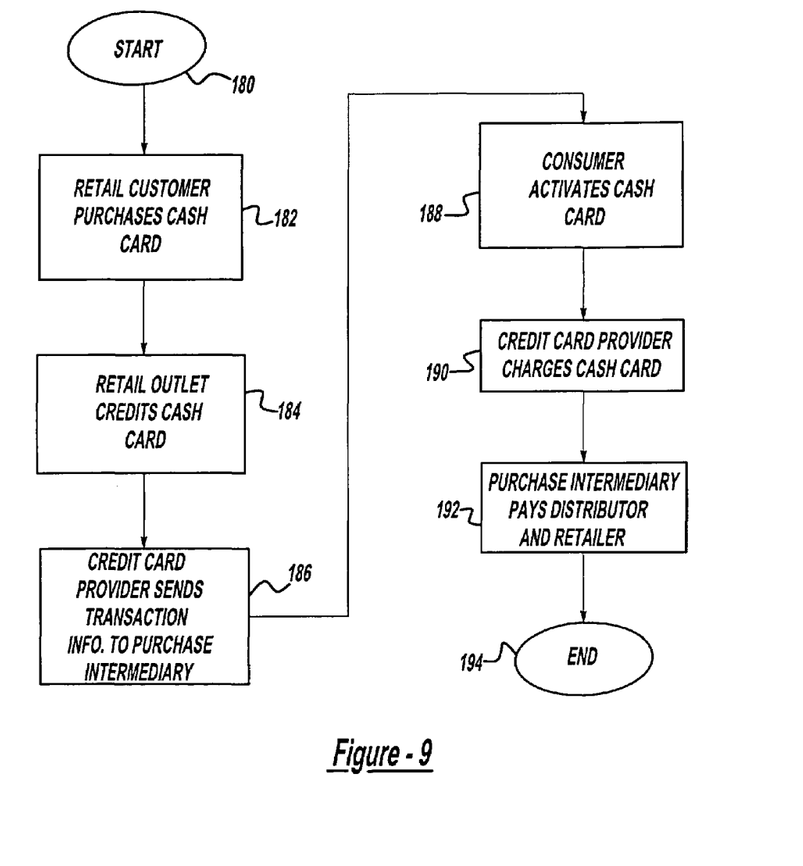
FIG. 9 is a block diagram of a method for crediting cash cards and distributing commissions for crediting the cash cards and associated accounts.

FIG. 9 depicts a flow chart for the process of purchasing and utilizing the cash cards by the consumer. The process begins at block 180 and proceeds to block 182 where the retail customer purchases the cash card as described above. At block 184, the retail outlet credits the cash card in accordance with the value of the cash card and various commissions to be paid. Control then proceeds to block 186 where the credit card provider sends transaction information to the purchase intermediary. At block 188, the consumer activates the card by contacting the purchase intermediary as described above. At block 190, the credit card provider loads the cash card with the predetermined amount. At block 192, the purchase intermediary pays the distributor and retail outlet for commissions of the sale of the card. The process terminates at block 194.

While the above description constitutes the preferred embodiment of the invention, it will be appreciated that the invention is susceptible to modification, variation, and change without departing from the proper scope or fair meaning of the accompanying claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of distributing an electronic cash card comprising the steps of:

requesting a plurality of unfunded cash cards from a credit card provider by a purchase intermediary;

receiving a list of account numbers for the plurality of unfunded cash cards from the credit card provider at the purchase intermediary;

placing an order to manufacture the plurality of unfunded cash cards with a card manufacturer by the purchase intermediary using the list of account numbers;

directing distribution of the plurality of unfunded cash cards from the card manufacture to a plurality of retail outlets;

maintaining as association of which unfunded cash cards are sent to which retail outlets in a data file by executing a software-implemented application on a computing device prior to the purchase of the cash card, wherein the data file indicates that the card has not been funded;

funding the cash card at a the retail outlet via a purchase of the cash card by a purchaser for a purchase price but without selection of an identifier of the purchaser by the purchaser of the cash card;

updating the data file by executing a software-implemented application on a computing device with a value for the cash card substantially contemporaneously with funding of the cash card at the retail outlet; and activating the given cash card after said funding when the retail outlet to which the given cash card was funded matches the retail outlet to which the cash card was sent to by the card manufacturer as indicated by the data file.

2. The method of claim 1 further comprising the step of remitting a commission to the retail outlet upon activation of the cash card.

3. The method of claim 1 further comprising providing the cash card to the retail outlet via a distributor of goods to the retail outlet other than the cash card.

4. The method of claim 1 further comprising the step of selling the card to the retail outlet for a nominal amount.

5. The method of claim 1 further comprising the step of manufacturing the cash card with a cash card carrier for supporting the cash card.

6. The method of claim 5 further comprising the step of providing at least one of advertisement and coupons on the cash card carrier.

7. The method of claim 1 further comprising the steps of:
activating the cash card over a network by registering the purchased cash card with the purchase intermediary; and
providing at least one of advertisement and coupons over the network for presentation to the purchaser.

8. The method of claim 1 further comprising the step of activating the cash card over a network by registering the purchased cash card with the purchase intermediary subsequent to the purchase of the cash card and prior to transacting a purchase with the cash card.

9. The method of claim 8 wherein contact information for the purchase intermediary is provided on the cash card.

10. A system for distributing an electronic cash card comprising:
a credit card provider adapted to receive a request for a plurality of unfunded cash cards from a purchasing intermediary and provides an account number for each of the plurality of unfunded cash cards to the purchasing intermediary in response thereto;
the purchasing intermediary places an order to manufacture the plurality of unfunded cash cards with a card manufacturer using the provided account numbers and directs distribution of the plurality of unfunded cash cards from the card manufacturer to a plurality of retail outlets;
the purchasing intermediary further maintains an association of which of the unfunded cash cards are sent to which retail outlets in a data file residing on a computing device and prior to the Purchase of the cash cards, wherein the data file indicates that the cash cards have not been funded;
a retail outlet for receiving at least one of the unfunded cash cards, the retail outlet funding a cash card upon purchase of the cash card for a purchase price by a purchaser but without selection of an identifier of the purchaser, wherein the purchase by the purchaser causes the purchase intermediary to update the data file with a value for the cash card substantially contemporaneously with funding of the cash card at the retail outlet and registration of the cash card after funding by the purchaser with the purchase intermediary causes activation of the cash card when the retail outlet at which the cash card was funded matches the retail outlet to which the cash card was sent to as indicated by the data file.

11. The apparatus of claim 10 wherein the purchase intermediary remits a commission to the retail outlet upon activation of the cash card.

12. The apparatus of claim 10 further comprising a distributor of goods to the retail outlet for providing the cash card to the retail outlet.

13. The apparatus of claim 10 wherein the purchase intermediary sells the card to the retail outlet for a nominal amount.

14. The apparatus of claim 10 further comprising a cash card carrier for supporting the cash card, wherein the cash card carrier includes at least one of advertisement and coupons on the cash card.

15. The apparatus of claim 10 wherein the purchaser activates the cash card over a network by registering the purchased cash card with the purchase intermediary.

16. A method of distributing an electronic cash card comprising the steps of:
ordering a cash card by a purchasing intermediary from a credit card provider;
directing distribution of the cash card to a retail outlet;
maintaining an associate between the cash card and the retail outlet to which the cash card was sent in a data file by executing a software-implemented application on a computing device prior to the purchase of the cash card, wherein the data file indicates that the cash card has not been funded;
funding the cash card at the retail outlet via a purchase of the cash card by a purchaser for a purchase price but without selection of a personal identifier by the purchaser of the cash card;
updating the data file by executing a software-implemented application on a computing device with a value for the cash card substantially contemporaneously with funding of the cash card at the retail outlet;
remitting a fee to the retail outlet after the cash card has been funded; and
activating the cash card after said funding by checking in the data file that the retail outlet to which the cash card was sent matches the retail outlet at which the cash card was funded.

* * * * *